May 5, 1931. V. LEEVO 1,803,534
TRIPOD FOR CAMERAS
Filed Feb. 15, 1930 2 Sheets-Sheet 1
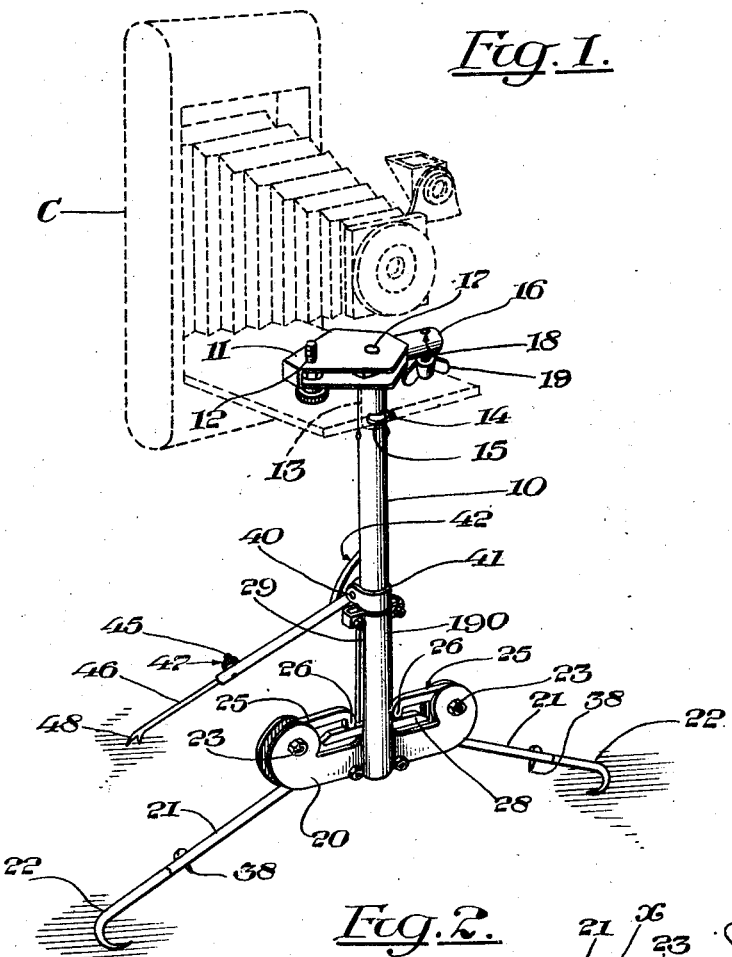

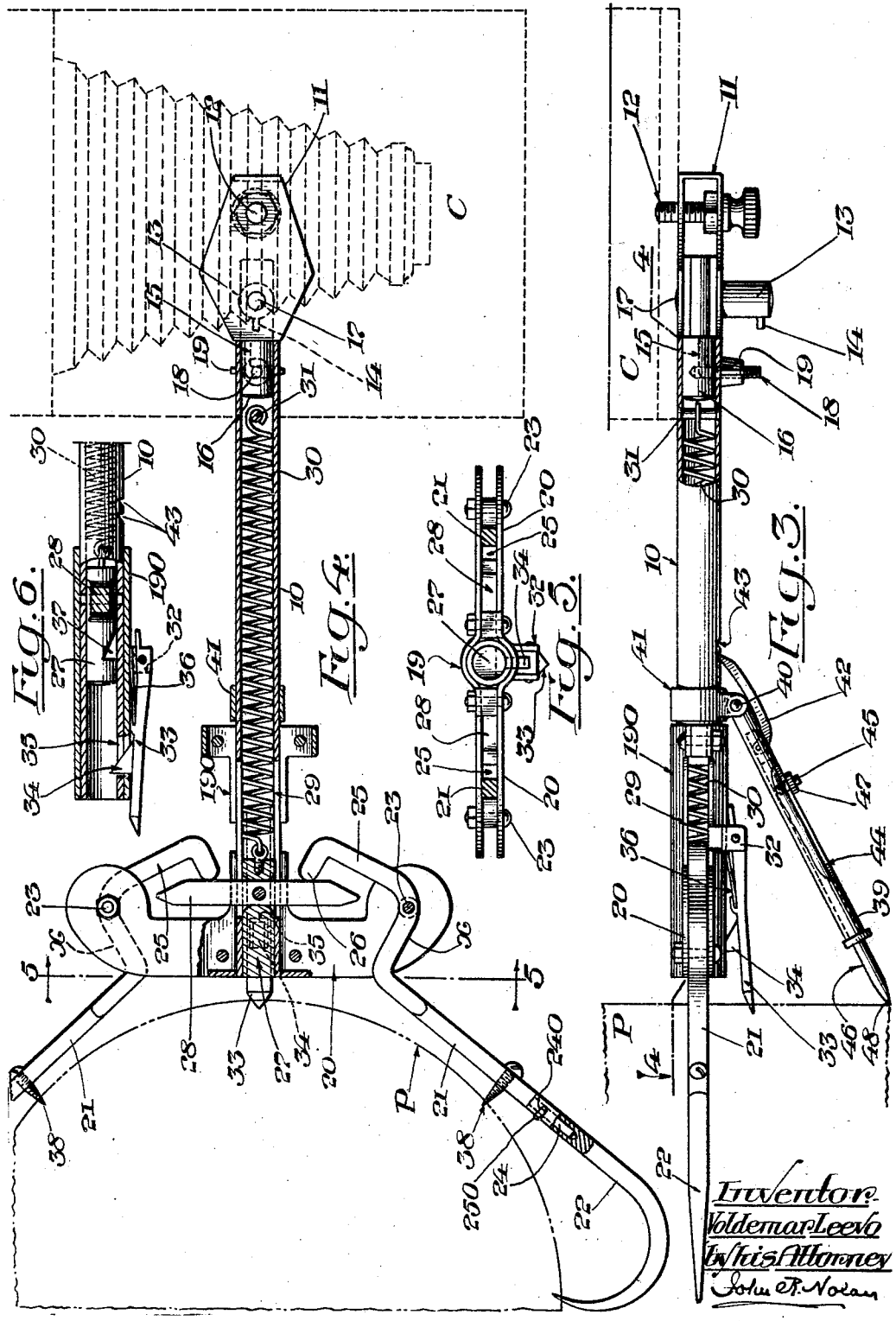

Patented May 5, 1931

1,803,534

UNITED STATES PATENT OFFICE

VOLDEMAR LEEVO, OF NEW YORK, N. Y.

TRIPOD FOR CAMERAS

Application filed February 15, 1930. Serial No. 428,623.

This invention relates to tripods, and more particularly to tripods for supporting cameras.

The principal object of my invention is to provide a tripod of simple and efficient construction and operation which can be readily erected in upright position upon a table, or the like, or can be as readily attached to an upright supporting post, or the like, so as to project laterally therefrom, which tripod in each location will effectually support a camera in proper position for photographic purposes.

Another object of my invention is to provide a tripod of the character mentioned which can be readily folded into small compass for convenience of packing and transportation.

With these and other objects in view my invention comprises novel features of construction and combinations of parts which will be hereinafter described; the scope of the invention being defined in the appended claims.

In the drawings—

Figure 1 is a perspective view of a tripod embodying the preferred form of my invention, the device being shown in upright position supporting a camera.

Fig. 2 is a plan of the tripod as collapsed and folded for convenience of packing and transportation.

Fig. 3 is a side elevation partly in section, showing the tripod attached to a tree or post and thereby supported in horizontal position.

Fig. 4 is a longitudinal section, partly in elevation, as on the line 4—4 of Fig. 3.

Fig. 5 is a transverse vertical section, as on the line 5—5 of Fig. 4.

Fig. 6 is a sectional elevation of the lower end of the tripod, showing its confined spring-actuated plunger in normal or retracted position.

Referring to the drawings, 10 designates a tubular standard, the upper end of which is adapted to receive a detachable head 11, whereby a camera, as C, can be supported in proper relation to the object to be photographed, whether the standard be vertically or horizontally disposed.

The head 11 preferably comprises a U-shaped sheet metal body having a transverse screw 12 therein for engagement with the usual socket plate of the camera to be supported. The body is provided, adjacent its open end and at a right angle thereto, with a fixed shank 13 adapted to be inserted in the upper end of the standard when the latter is to be mounted in upright position. In the present instance a bayonet joint is provided to secure the shank 13 to the standard, which joint comprises a lateral pin 14 on the shank and an angular slot 15 in the upper end of the standard.

The body of the head 11 has at its open end a longitudinally projecting shank 16 which is pivoted in and between the walls of the body, as at 17, and which shank is adapted to be inserted in the upper end of the standard when the latter is to be supported in horizontal position by attachment to a tree, post, or the like. Hence the camera is supported in proper position and has capacity for horizontal adjustment about the axial point 17 of the body of the head. The shank 16 has a projecting pin 18 for engagement with the bayonet slot 15 of the standard, which pin is threaded and is equipped with a clamp nut 19 adapted to clamp the wall of the standard and prevent rotary movement of the body relatively to the standard.

The tubular standard has affixed thereto a T-shaped base piece comprising, preferably, a longitudinally-slotted tubular shank 190 and a longitudinally slotted cross-member 20, the whole being composed of two associated sheet metal stampings of appropriate form. The respective ends of the cross-members 20 embrace and have pivoted therein, as at 23, a pair of lever-like legs 21 terminating in pointed hook extensions 22. These extensions are preferably separate sections pivotally connected to the main portions of the legs in a manner to permit the extensions to be independently rotated to a limited extent to dispose their respective hooks in any desired relative angular position of adjustment. In the present instance the lower ends of the main portions of the legs 21 are reduced to provide pivots 24 which are rotatably fitted in sockets in the adjacent ends of the respective hook extensions, the latter being formed with arcuate slots 240 through which extend stop pins 250 from the respective pivots 24.

The upper or pivotal ends of the legs 21, which swing between the walls of the cross-members 20, are angularly bent, as at $x$, and thence extended to provide up-standing portions 25 terminating preferably in inturned toes 26, which portions constitute leg actuating members with which co-operates a spreader member embodying preferably a cross-bar 28 which is movable into and from the paths of the two portions 25.

The cross-bar 28 extends through and is secured to a plunger 27 slidably fitted in the tubular standard, which standard and the tubular shank of the T-piece have registering longitudinal slots 29 for the free passage and guidance of the projecting arms of the cross-bar. The extremities of the arms are bevelled as shown, to permit their free sliding contact with the toes 26 of the respective arms when the ends of the cross-bar are vertically moved in contact with such toes.

The plunger, with its cross-bar, is normally held in elevated or retracted position by means of a long spiral spring 30 which is confined within the standard, and which spring is fastened at its respective ends to the plunger and to a suitably-disposed cross-pin 31 in the standard.

Pivotally mounted in and between lugs 32 on one side of the tubular shank 190 of the T-piece is one end of a latch lever 33, the free end of which is pointed and projects slightly beyond the cross-member 20 of the T-piece. On the inner face of the latch lever is a bevelled tooth 34 which is movable into and from an opening 35 in the lower portion of the T-piece and standard. The tooth, which is normally held in inward position by the action of a suitably disposed spring 36 on the latch lever, is so located in reference to a bevelled notch 37 in the plunger 27, that when the plunger and its cross-bar are manually moved downward to position the cross-bar adjacent the slotted cross-member 22 and below the paths of the leg actuating members 25, the notch 37 is at once engaged by the tooth 34, thus locking the plunger and cross-bar in down position in opposition to the retractive force of the spring. Hence the cross-bar acts as a stop against which the toes of the members 25 of the legs 21 abut when the legs are fully spread apart, as seen in Fig. 1. If a latch lever be manipulated to disengage the tooth 34 from the notch 37 of the plunger, the cross-bar 28 will be automatically returned to its original retracted position, thus permitting the legs to be folded compactly against and longitudinally of the standard, as seen in Fig. 2.

When the cross-bar 28 is latched in its down position, if the legs 21 be positioned to embrace a post, tree, or the like, as indicated at P in Figs. 3 and 4, and the standard then be forcibly pushed toward the post, &c., the projecting end of the latch lever 33 will engage the post, &c., and thereby be swung downward, as seen in Fig. 3, thus releasing the plunger 27; whereupon the cross-bar 28, being pulled upward by the retractive force of the spring 30, will bear against the opposing toes of the leg actuating members 25 in a manner to swing the legs toward each other and force their pointed hook extremities into firm engagement with the post, &c. The main portions of the legs 21 are preferably provided with inwardly projecting points 38 which engage the post, &c., thus co-acting with the pointed hooks to steady the legs.

The upper section 39 of a telescopic leg is pivoted, as at 40, to a slidable collar 41 on the standard, which section is provided adjacent the pivot with a hinged dog 42 adapted to be moved into engaging relation with any of a series of spaced peripheral notches 43 in the standard, thus maintaining the leg in any desired position of longitudinal adjustment on the standard.

The leg section 39 is provided with a longitudinal slot 44 for the passage of a screw stud 45 on the extensible section 46 of the leg, which stud is equipped with a nut 47 that affords a knob whereby the section 46 can be readily moved to and secured in any desired position of longitudinal adjustment with respect to the pivoted section. The leg section 46 is preferably provided at its lower end with pointed supporting prongs 48.

The three legs may be positioned, as seen in Fig. 1, to rest on a table or the like and thus support the standard in upright position similarly to an ordinary tripod, in which case the spring-actuated cross-bar 28 is locked in its down position and the head 11 for the support of the camera is mounted with its shank 13 in the upper end of the standard 10. Or the three legs may be positioned, as seen in Figs. 3 and 4, to engage a vertical post, P, or the like, and thus support the standard in horizontal position, in which case the cross-bar 28 engages the toes of the leg actuating members 25, and the head 11 is mounted with its shank 16 in the upper end of the standard; it being noted that the telescopic leg 39, 46 is positioned at a proper angle to engage the post, &c., and serve as a diagonal supporting strut or brace for the apparatus.

As seen in Fig. 2, the telescopic leg can be contracted and folded against and longitudinally of the standard, thus, in conjunction with the folding capacity of the legs 21, 22, enabling the tripod to be readily folded into small compass when not in actual use.

It is to be understood that my invention is not limited to the particular exemplifying construction herein disclosed as the mechanism may be modified within the principle of the invention and the scope of the appended claims.

I claim—

1. A tripod including a standard, means for supporting a camera thereon, a base member on the standard, two oppositely-disposed legs pivotally mounted on said member and movable outwardly beyond the member or foldable along the standard, as desired, and means operative to swing the outwardly-projecting legs into gripping relation to a supporting object embraced by the legs.

2. A tripod including a standard, means for supporting a camera thereon, a base member on the standard, two oppositely-disposed legs pivotally mounted on said member and movable outwardly beyond the member or foldable along the standard, as desired, means operative to swing the outwardly-projecting legs into gripping relation to a supporting object embraced by the legs, a third leg pivotally and slidably mounted on the standard, and means for temporarily fixing said third leg at a position of adjustment on the standard.

3. A tripod including a standard, means for supporting a camera thereon, a base member on the standard, two oppositely-disposed legs pivotally mounted on said member and movable beyond the member or foldable along the standard, as desired, spring-controlled means operative to swing the outwardly-projecting legs into gripping relation, and means for rendering said spring-controlled means operative when the legs are positioned to embrace a supporting object.

4. A tripod including a standard, means for supporting a camera thereon, a base member on the standard, two oppositely-disposed legs pivotally mounted on said member and movable beyond the member or foldable along the standard, as desired, spring-controlled means operative to swing the outwardly-projecting legs into gripping relation, means for rendering said spring-controlled means operative when the legs are positioned to embrace a supporting object, a third leg pivotally and slidably mounted on the standard, and means for temporarily fixing said third leg in respect to the standard.

5. A tripod including a standard, means for supporting a camera thereon, two oppositely-disposed legs pivotally mounted with respect to said standard and adapted to be arranged to support the standard in any of various positions, or to be folded longitudinally of and adjacent the standard, as desired, said legs having gripping portions at their free ends and actuating members at their pivoted ends, a spreader member operative to spread the said actuating members and thereby effect the engagement of the gripping portions with an extraneous supporting object embraced by the legs, resilient means tending to maintain the spreading member in active relation to the said actuating members, and means for temporarily locking said spreading member in idle relation to said actuating members in opposition to the action of the said resilient means.

6. A tripod including a standard, means for supporting a camera thereon, two oppositely-disposed legs pivotally mounted with respect to said standard and adapted to be arranged to support the standard in any of various positions, or to be folded longitudinally of and adjacent the standard, as desired, said legs having gripping portions at their free ends and actuating members at their pivoted ends, a spreader member operative to spread the said actuating members and thereby effect the engagement of the gripping portions with an extraneous supporting object embraced by the legs, resilient means tending to maintain the spreading member in active relation to the said actuating members, and means for temporarily locking said spreading member in idle relation to said actuating members in opposition to the action of the said resilient means, said locking means being constructed and arranged to bear against the object embraced by the legs and be thereby moved into unlocking condition.

7. A tripod including a standard, means for supporting a camera thereon, two oppositely-disposed legs pivotally mounted with respect to said standard and adapted to be arranged to support the standard in any of various positions, or to be folded longitudinally of and adjacent the standard, as desired, each leg having a relatively rotatable gripping section at its free end and a relatively fixed actuating extension at its upper end, a spreader member operative to spread the extensions and thereby effect the engagement of the gripping sections with an extraneous supporting object embraced by the legs, resilient means tending to maintain the spreading member in active relation to the said extensions, and means for temporarily locking said spreading member in idle relation to said extensions in opposition to the action of the said resilient means.

8. A tripod including a standard, means for supporting a camera thereon, two oppositely disposed legs pivotally mounted with respect to said standard and arranged to support the standard in any of various positions, or to be folded longitudinally of and adjacent the standard, as desired, each leg having a relatively rotatable gripping section at its free end and a relatively fixed actuating extension at its upper end, a member operative to spread the actuating extensions and thereby effect the engagement of the gripping sections with an extraneous supporting object embraced by the legs, resilient means tending to maintain the spreading member in active relation to the said extensions, and means for temporarily locking said spreading member in idle relation to said extension in opposition to the action of the said resilient means, said locking means being constructed and arranged to bear against the embraced object and to be thereby moved into unlocking condition.

9. In a tripod, a standard, means for supporting a camera thereon, a base member on said standard, two oppositely-disposed legs pivotally mounted on said member and having actuating extensions adjacent their pivots, a spreader member in co-operative relation to said extensions, said spreader member mounted on the standard for movement into and from the path of the two extensions, means for maintaining said spreader member retracted above said path, means for temporarily locking said spreader member in projected position below said path, and a third leg mounted on the standard.

10. In a tripod, a standard, means for supporting a camera thereon, a base member on said standard, two oppositely-disposed legs pivotally mounted on said member and having leg actuating extensions adjacent their pivots, a spreader member in co-operative relation to said extensions, said spreader member mounted on the standard for movement into and from the path of the extensions, resilient means for maintaining said spreader member normally retracted above said path, means, including a latch, for locking said spreader member in projected position below said path against the retractive action of the resilient means, and a third leg mounted on the standard.

11. In a tripod, a standard, means for supporting a camera thereon, a base member on said standard, two oppositely-disposed legs pivotally mounted on said standard and having actuating extensions adjacent their pivots, a spreader member in co-operative relation to said extensions, said spreader member being mounted on the standard for movement into and from the path of the two extensions, a spring confined in said standard and operatively connected with said spreader member to maintain the latter above said path, a latch device for temporarily locking said spreader member in projected position below said path, said latch device being so constructed and arranged that when the legs are in embracing relation to a post or like object the latch device is released by contact with the object, and a third leg mounted on the standard.

12. In a tripod, a standard, means for supporting a camera thereon, a base member on said standard, two oppositely-disposed legs pivotally mounted on said member and having leg actuating extensions adjacent their pivots, a spreader member in co-operative relation to said extensions, said spreader member mounted on the standard for movement into and from the path of the extensions, resilient means for maintaining said spreader member normally retracted above said path, means, including a latch, for locking said spreader member in projected position below said path against the retractive action of the resilient means, the free end of said latch projecting below the base member, and a third leg mounted on the standard.

Signed at New York, in the county and State of New York, this 13th day of February, A. D. 1930.

VOLDEMAR LEEVO.